United States Patent
Carvell et al.

(10) Patent No.: US 11,623,529 B2
(45) Date of Patent: Apr. 11, 2023

(54) PULSE MODULATED CONTROL WITH FIELD WEAKENING FOR IMPROVED MOTOR EFFICIENCY

(71) Applicant: Tula eTechnology, Inc., San Jose, CA (US)

(72) Inventors: Paul Carvell, San Jose, CA (US); Adya S. Tripathi, San Jose, CA (US)

(73) Assignee: Tula eTechnology, Inc., San Jose, CA (US)

( * ) Notice: Subject to any disclaimer, the term of this patent is extended or adjusted under 35 U.S.C. 154(b) by 0 days.

(21) Appl. No.: 17/497,147

(22) Filed: Oct. 8, 2021

(65) Prior Publication Data
US 2022/0024322 A1 Jan. 27, 2022

Related U.S. Application Data

(63) Continuation of application No. 17/204,269, filed on Mar. 17, 2021, now Pat. No. 11,167,648, and a
(Continued)

(51) Int. Cl.
*H02P 27/08* (2006.01)
*B60L 15/08* (2006.01)
(Continued)

(52) U.S. Cl.
CPC ............. *B60L 15/08* (2013.01); *B60L 15/20* (2013.01); *H02P 23/0027* (2013.01);
(Continued)

(58) Field of Classification Search
CPC ...... H02P 27/08; H02P 23/0027; H02P 23/02; B60L 15/08; B60L 15/20; B60L 2240/421; B60L 2240/423; B60L 2240/527
See application file for complete search history.

(56) References Cited

U.S. PATENT DOCUMENTS

| 4,441,043 A | 4/1984 | Decesare |
| 4,989,146 A | 1/1991 | Imajo |

(Continued)

FOREIGN PATENT DOCUMENTS

| CN | 1829070 | 9/2006 |
| CN | 1829070 A | 9/2006 |

(Continued)

OTHER PUBLICATIONS

Mirzaeva et al., "The use of Feedback Quantizer PWM for Shaping Inverter Noise Spectrum", Power Electronics and Motion Control Conference (EPE/PEMC), 2012 15th International IEEE, Sep. 4, 2012, pp. DS3c. 10-1, XP032311951, DOI: 10.1109/EPEPEMC.2012.6397346, ISBN: 978-1-4673-1970.6.

(Continued)

*Primary Examiner* — Cortez M Cook
(74) *Attorney, Agent, or Firm* — Beyer Law Group LLP

(57) ABSTRACT

Modulated pulse control of electric machines to deliver a desired output in a more energy efficient manner by either (a) operating the electric machine in a continuous mode when a requested torque demand is greater than the peak efficiency torque of the electric machine or (b) in a pulsed modulation mode when the requested torque demand is less than the peak efficiency torque of the electric machine. When operating in the pulsed modulation mode, the inverter may be deactivated to further improve the system efficiency when field weakening is not required to mitigate or eliminate generation of a retarding torque in situations when Back Electromagnetic Force (BEMF) exceeds a supply voltage for the inverter of the machine.

42 Claims, 10 Drawing Sheets

Related U.S. Application Data continuation-in-part of application No. 16/912,313, filed on Jun. 25, 2020, now Pat. No. 11,228,272, which is a continuation of application No. 16/353,166, filed on Mar. 14, 2019, now Pat. No. 10,742,155.

(60) Provisional application No. 63/161,405, filed on Mar. 15, 2021, provisional application No. 63/013,396, filed on Apr. 21, 2020, provisional application No. 62/810,861, filed on Feb. 26, 2019, provisional application No. 62/658,739, filed on Apr. 17, 2018, provisional application No. 62/644,912, filed on Mar. 19, 2018.

(51) Int. Cl.
*B60L 15/20* (2006.01)
*H02P 23/02* (2006.01)
*H02P 23/00* (2016.01)

(52) U.S. Cl.
CPC ......... *H02P 23/02* (2013.01); *B60L 2240/421* (2013.01); *B60L 2240/423* (2013.01); *B60L 2240/527* (2013.01)

(56) References Cited

U.S. PATENT DOCUMENTS

| | | |
|---|---|---|
| 5,099,410 A | 3/1992 | Divan |
| 5,151,637 A | 9/1992 | Takada et al. |
| 5,325,028 A | 6/1994 | Davis |
| 5,483,141 A | 1/1996 | Uesugi |
| 5,640,073 A | 6/1997 | Ikeda et al. |
| 5,731,669 A | 3/1998 | Shimizu et al. |
| 6,291,960 B1 | 9/2001 | Crombez |
| 6,308,123 B1 | 10/2001 | Ikegaya et al. |
| 6,370,049 B1 | 4/2002 | Heikkila |
| 6,424,799 B1 | 7/2002 | Gilmore |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,960,888 B2 | 6/2011 | Ai et al. |
| 7,969,341 B2 | 6/2011 | Robbe et al. |
| 8,099,224 B2 | 1/2012 | Tripathi et al. |
| 8,768,563 B2 | 7/2014 | Nitzberg et al. |
| 8,773,063 B2 | 7/2014 | Nakata |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Tripathi |
| 10,291,168 B2 | 5/2019 | Fukuta |
| 10,291,174 B2 | 5/2019 | Irie et al. |
| 10,320,249 B2 | 6/2019 | Okamoto et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,944,352 B2 | 3/2021 | Mazda et al. |
| 11,077,759 B1 | 8/2021 | Srinivasan |
| 11,088,644 B1 | 8/2021 | Carvell |
| 11,133,763 B1 | 9/2021 | Islam |
| 11,133,767 B2 | 9/2021 | Serrano et al. |
| 11,228,272 B2 | 1/2022 | Tripathi |
| 2001/0039926 A1 | 11/2001 | Kobayashi et al. |
| 2002/0043954 A1 | 4/2002 | Hallidy et al. |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2007/0216345 A1 | 9/2007 | Kanamori |
| 2007/0287594 A1 | 12/2007 | DeGeorge et al. |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0031922 A1* | 2/2011 | Sakai ............... H02P 27/08 318/519 |
| 2011/0089774 A1 | 4/2011 | Kramer |
| 2011/0101812 A1 | 5/2011 | Finkle et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217921 A1 | 8/2012 | Wu et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0240404 A1 | 8/2015 | Kim et al. |
| 2015/0246685 A1 | 9/2015 | Dixon et al. |
| 2015/0261422 A1 | 9/2015 | Den et al. |
| 2015/0297824 A1 | 10/2015 | Cabiri et al. |
| 2015/0318803 A1 | 11/2015 | Wu et al. |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0163108 A1 | 6/2017 | Schencke et al. |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0288629 A1 | 9/2019 | Tripathi |
| 2019/0288631 A1 | 9/2019 | Tripathi |
| 2019/0341820 A1 | 11/2019 | Krizan et al. |
| 2020/0212834 A1 | 7/2020 | Mazda et al. |
| 2020/0262398 A1 | 8/2020 | Sato et al. |

(56) References Cited

U.S. PATENT DOCUMENTS

| | | |
|---|---|---|
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0146909 A1 | 5/2021 | Serrano et al. |
| 2021/0203263 A1 | 7/2021 | Serrano et al. |
| 2021/0351733 A1 | 11/2021 | Carvell |

FOREIGN PATENT DOCUMENTS

| | | |
|---|---|---|
| CN | 102381265 | 3/2012 |
| CN | 102381265 A | 3/2012 |
| CN | 104716754 A | 6/2015 |
| CN | 204589885 | 8/2015 |
| CN | 204589885 U | 8/2015 |
| CN | 105196877 A | 12/2015 |
| CN | 205229379 | 5/2016 |
| CN | 205229379 U | 5/2016 |
| CN | 106932208 | 7/2017 |
| CN | 106932208 A | 7/2017 |
| CN | 107067780 | 8/2017 |
| CN | 107067780 A | 8/2017 |
| CN | 105196877 | 9/2017 |
| CN | 207129052 | 3/2018 |
| CN | 207129052 U | 3/2018 |
| CN | 108216026 | 6/2018 |
| CN | 108216026 A | 6/2018 |
| CN | 108445386 | 8/2018 |
| CN | 108445386 A | 8/2018 |
| CN | 110212725 | 9/2019 |
| DE | 102014206342 | 10/2015 |
| EP | 2605398 A1 | 6/2013 |
| FR | 2989479 | 10/2013 |
| GB | 2273212 | 8/1994 |
| JP | 10243680 | 9/1998 |
| JP | 2008-079686 | 4/2008 |
| JP | 2008-079686 A | 4/2008 |
| JP | 2009-065758 A | 3/2009 |
| JP | 2011-67043 | 3/2011 |
| JP | 2014-033449 A | 2/2014 |
| JP | 2017-011970 A | 1/2017 |
| JP | 2017-200382 | 11/2017 |
| JP | 2018-033250 A | 3/2018 |
| KR | 10-2017-0021146 A | 2/2017 |
| KR | 10-2017-0032976 A | 3/2017 |
| WO | WO03/36787 A1 | 5/2003 |
| WO | WO2012-010993 A2 | 1/2012 |

OTHER PUBLICATIONS

Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL.2005.854029.

Ramsey, "How This Father and Son's New Electric Turbine Could Revolutionize Electric Cars; Hunstable Electric Turbine can Produce up to Three Times the Torque of Any Other Motor", https://www.parsintl.com/publication/autoblog/, Mar. 8, 2020.

Srinivasan, U.S. Appl. No. 17/158,230, filed Jan. 26, 2021.

Carvell et al., U.S. Appl. No. 17/204,269, filed Mar. 17, 2021.

Cai et al., "Torque Ripple Reduction for Switched Reluctance Motor with Optimized PWM Control Strategy", https://www.mdpi.com/1996-1073/11/11/3215, Oct. 15, 2018, 27 pages.

Spong et al., "Feedback Linearizing Control of Switched Reluctance Motors", IEEE Transactions on Automatic Control, vol. AC-32, No. 5, May 1987, pp. 371-379.

International Search Report and Written Opinion dated Jul. 9, 2021 from International Application No. PCT/US2021/022756.

\* cited by examiner

PULSE MODULATED CONTROL WITH FIELD WEAKENING FOR IMPROVED MOTOR EFFICIENCY

CROSS-REFERENCE TO RELATED APPLICATIONS

This application is a Continuation of U.S. application Ser. No. 17/204,269, filed Mar. 17, 2021, which claims priority to U.S. Provisional Application Ser. No. 63/013,396, filed Apr. 21, 2020 and 63/161,405, filed Mar. 15, 2021. This application is also a Continuation-in-Part of U.S. application Ser. No. 16/912,313, filed on Jun. 25, 2020 (TULAP200C) which is a Continuation of U.S. application Ser. No. 16/353,166, filed on Mar. 14, 2019 (now U.S. Pat. No. 10,742,155, issued on Aug. 11, 2020), which claims priority of U.S. Provisional Patent Application Nos.: 62/644,912, filed on Mar. 19, 2018; 62/658,739, filed on Apr. 17, 2018; and 62/810,861 filed on Feb. 26, 2019, all of which are incorporated herein by reference in their entirety.

BACKGROUND OF THE INVENTION

The present application relates generally to modulated pulse control of electric machines to selectively deliver a desired output in a more energy efficient manner, and more particularly, to pulse modulation control that uses field weakening to mitigate or eliminate generation of a retarding motor torque in situations when Back Electromagnetic Force (BEMF) exceeds a supply voltage for motor inverter.

The term "electric machine" as used herein is intended to be broadly construed to mean both electric motors and generators. Electric motors and generators are structurally very similar. Both include a stator having a number of poles and a rotor. When an electric machine is operating as a motor, it converts electrical energy into mechanical energy. When operating as a generator, the electric machine converts mechanical energy into electrical energy.

Modern electric machines have relatively high energy conversion efficiencies. The energy conversion efficiency of most electric machines, however, can vary considerably based on their operational load. With many applications, an electric machine is required to operate under a wide variety of different operating load conditions. As a result, machines typically operate at or near the highest levels of efficiency at certain times, while at other times, they operate at lower efficiency levels.

Battery powered electric vehicles provide a good example of an electric machine operating at a wide range of efficiency levels. During a typical drive cycle, an electrical vehicle will accelerate, cruise, de-accelerate, brake, corner, etc. Within certain rotor speed and/or torque ranges, the electric machine operates at or near is most efficient operating point, i.e. its "sweet spot". Outside these ranges, the operation of electric machine is less efficient. As driving conditions change, the electric machine transitions between high and low operating efficiency levels as the rotor speed and/or torque changes. If the electric machine could be made to operate a greater proportion of a drive cycle in high efficiency operating regions, the range of the vehicle for a given battery charge level would be increased. Since the limited range of battery powered electric vehicles is a major commercial impediment to their use, extending the operating range of the vehicle is highly advantageous.

Although the energy conversion efficiency of conventional electric machines is generally good, there are continuing efforts to further improve energy conversion efficiencies over broader ranges of operating conditions.

SUMMARY OF THE INVENTION

The present application relates to modulated pulse control of electric machines to selectively deliver a desired output in a more energy efficient manner.

In a non-exclusive embodiment, the electric machine is operated either (a) in a continuous mode when a requested torque demand is greater than a designated pulsing threshold or (b) in a pulse modulation mode when the requested torque demand is less than the pulsing threshold. When operating in pulse modulation mode, a duty cycle is defined and the inverter of the machine is pulsed. By properly selecting the duty cycle and magnitude of the pulses, the average shaft torque of the machine during the pulsing equals the shaft torque output of the machine if continuously operated. But since the motor is operated at or near its peak efficiency torque during the pulses, the overall efficiency of the machine is improved compared to continuous operation below the peak efficiency torque. In some embodiments the pulsing threshold varies as a function of the electric machine's shaft speed. In some embodiments, the pulsing threshold for any particular machine speed is at or close to the peak efficiency torque for that machine speed.

During pulses, the inverter is enabled and the motor generates torque at or near its peak efficiency levels. In the periods between pulses, the inverter is ideally disabled so the electric machine generates no torque. However, if a need for field weakening is present, which generally occurs when Back Electromagnetic Force (BEMF) of the motor exceeds the power supply of the inverter, then the inverter remains active, but no torque is demanded (i.e., zero torque). This allows to inverter to continue to apply field weakening during the zero torque periods between pulses. When the electric motor is operating as a motor, the field weakening mitigates or eliminates any retarding torque that would otherwise be generated by the motor during pulsing.

In various embodiments, the electric machine is any type of electric machine capable of reducing BEMF by applying field weakening. Representative electric machines include, but are not limited to, internal permanent magnets, surface permanent magnets, induction, synchronous reluctance, permanent assisted synchronous reluctance, separately excited induction, flux switching, switch reluctance, and other types of machines.

The describe approach can be used to improve the energy conversion efficiency of both motors and generators.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Pulsed electric machine control is described in U.S. patent application Ser. No. 16/818,570 filed Mar. 13, 2020, U.S. patent application Ser. No. 16/353,159 filed on Mar. 14, 2019, and U.S. Provisional Patent Application Nos.: 62/644,912, filed on Mar. 19, 2018; 62/658,739, filed on Apr. 17, 2018; and 62/810,861 filed on Feb. 26, 2019. Each of the foregoing applications is incorporated herein by reference in their entirety.

The present application relates further improvements to pulsed control of a wide variety of electric machines (e.g., electric motors and generators) that would otherwise be operated in a continuous manner. For the sake of simplicity, the discussion below is largely described within the context of an electric machine operating as a motor. However, it should be appreciated that the concepts described in the context of motors are generally equally applicable to electric machines operating as generators.

Vehicle Motor Efficiency Map

Figure 1:
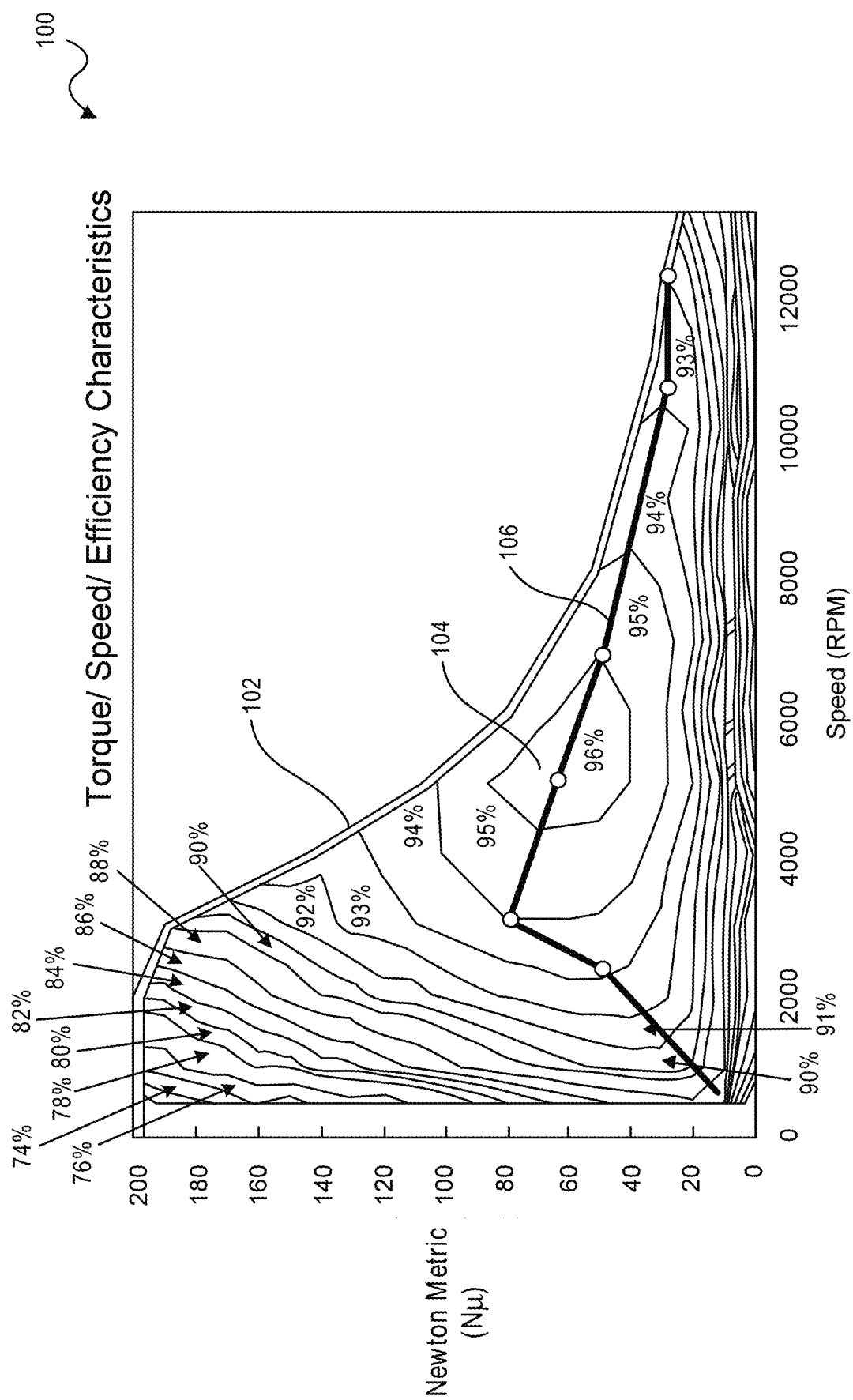
FIG. 1 is a representative Torque/Speed/Efficiency graph illustrating the energy conversion efficiency of a representative electric machine while operating as an electric motor under different operating conditions.

Referring to FIG. 1, an exemplary vehicle electric machine efficiency map 100 while operating as a motor under different load and speed conditions is illustrated. The map 10 plots torque (N*m) along the vertical axis as a function of electric machine speed (RPM) along the horizontal axis. The maximum steady-state output power is given by curve 102.

The area under the peak-torque/speed curve 102 is mapped into a plurality of regions, each labeled by an operational efficiency percentage. For the particular electric machine shown, the following characteristics are evident:

The most efficient or "sweet-spot" region of its operating range is the operating region labeled 104, which is generally in the range of 4,500-6,000 RPM with a torque output in the range of about 40-70 N*m. In region 104, the energy conversion efficiency is on the order of 96%, making it the "sweet spot", where the motor is operating in its most efficient operating range.

As the motor speed increases beyond approximately 6,000+ RPM, the efficiency tends to decrease, regardless of the output torque.

As the output torque increases beyond 70 N*m or falls below 40 N*m, the efficiency percentage tends to decrease from its peak, in some situations rather significantly. For example, when the motor is operating at approximately 2,000 RPM and an output torque of 100 N*m, the efficiency is approximately 86%. When torque output falls below about 30 N*m, regardless of the motor speed, the efficiency drops, approaching zero at zero load.

At any particular electric machine speed, there will be a corresponding most efficient output torque, which is diagrammatically illustrated by a maximum efficiency curve 106.

The map 100 as illustrated was derived from an electric motor used in a 2010 Toyota Prius. Map 100 is for an internal permanent magnet synchronous electric machine. It should be understood that this map 100 is merely illustrative and should not be construed as limiting in any regard. A similar map can be generated for just about any electric machine, regardless of whether it is used in a vehicle or in some other application.

As can be seen from the map 100, when motoring, the electric machine is generally most efficient when operating within the speed and torque ranges of the sweet spot 104. If the operating conditions can be controlled so that the motor operates a greater proportion of the time at or near its sweet spot 104, the overall energy conversion efficiency of the motor can be significantly improved.

From a practical point of view, however, many driving situations dictate that the motor operate outside of the speed and torque ranges of the sweet spot 104. In electric vehicles it is common to have no transmission or gear box and as such have a fixed ratio of the electric motor rotation rate to the wheel rotation rate. In this case, the motor speed may vary between zero, when the vehicle is stopped, to a relatively high RPM when cruising at highway speeds. The torque requirements may also vary widely based on factors such as whether the vehicle is accelerating or decelerating, going uphill, going downhill, traveling on a level surface, braking, etc.

As also seen in FIG. 1, at any particular speed, there will be a corresponding most efficient output torque which is diagrammatically illustrated by maximum efficiency curve 106. From a conceptual standpoint, when the desired motor torque is below the most efficient output torque for the current motor speed, the overall efficiency of the motor can be improved by pulsing the motor, so as to operate the motor a proportion of time at or near its peak efficiency for the given speed and the remainder of the time at a low or zero torque output level. The average torque thus generated is controlled by controlling the duty cycle of peak efficiency torque applied to the electric machine.

It should be appreciated that the electric machine would have a similar efficiency map that characterizes its efficiency when acting as a generator.

Pulsed Operation

Figure 3:
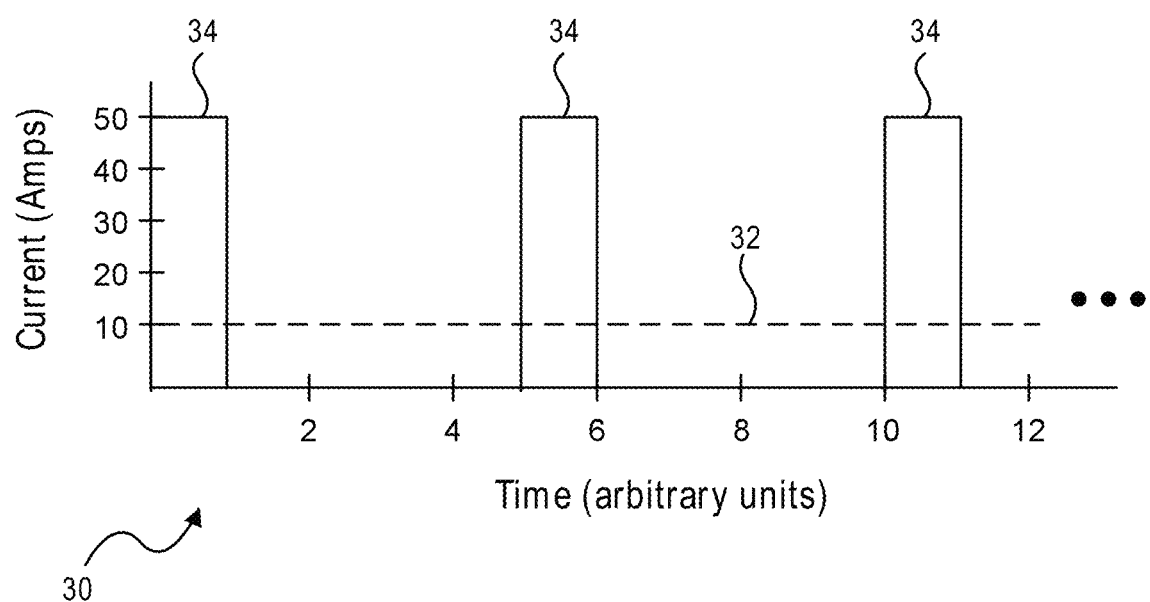
FIG. 3 is a graph illustrating a pulsed current signal applied to an electric machine in response to a torque demand while operating as a motor.

FIG. 3 is a graph 30 that diagrammatically illustrates an example of pulsed motor operation. In this particular example, the desired motor torque is 10 Nm, but the most efficient torque output for the current operating motor speed is 50 Nm. Conceptually, the motor can be driven to deliver a net torque of 10 Nm by causing the motor to deliver 50 Nm of torque for 20% of the time and then delivering no (zero) torque the remaining 80% of the time. Since the motor operates more efficiently when it is delivering 50 Nm than when it delivers 10 Nm, the motor's overall efficiency can be improved by pulsing the motor's operation in the described manner. In the example illustrated in FIG. 3 the motor produces a motor output of 50 Nm (labeled 34) for a period of 1 time unit out of every 5 time units and then the motor is controlled to produce zero torque during the intervening 4 time units.

In FIG. 3, the graph 30 plots on the vertical axis a total applied current to an electric machine 12 (acting as an electric motor) versus time on the horizontal axis. For illustrative purposes, it will be assumed that each ampere of applied current will produce 1 N*m of output torque. In this particular example, a desired motor output torque is 10 N*m, which will require 10 amps of current as represented by the dashed line 32. Also in this example, the most efficient torque output for the motor is 50 N*m corresponding to 50 amps of applied current.

During conventional operation, the motor would continuously generate 10 N*m, provided the desired torque remained at this value. With pulsed-control operation, the motor is pulsed, as represented by pulses 34, to deliver 50 N*m of torque for 20% of the time. The remaining 80% of the time, the motor in this example is off. The net output of the motor therefore meets the operational demand of 10 N*m. Since the motor operates more efficiently when it is delivering 50 N*m than when it delivers 10 N*m, the motor's overall efficiency is thus improved by pulsing the motor using a 20% duty cycle while still meeting the average torque demand.

In the above example, the duty cycle is not necessarily limited to 20%. As long as the desired motor output, does not exceed 50 N*m, the desired motor output can be met by a wide range of different duty cycles. For instance, if the desired motor output changes to 20 N*m, the duty cycle of the motor operating at 50 N*m can be increased to 40%; if the desired motor output changes to 40 N*m, the duty cycle can be increase to 80%; if the desired motor output changes to 5 N*m, the duty cycle can be reduced to 10% and so on. Generally, pulsed motor control can potentially be used advantageously any time that the desired motor torque falls below its maximum efficiency curve (i.e., the curve 106 of FIG. 1).

On the other hand, when the desired motor torque is at or above the maximum efficiency curve, the motor may be operated in a conventional (continuous or non-pulsed) manner to deliver the desired torque. Pulsed operation thus offers opportunity for efficiency gains when the motor is required to deliver an average torque below the peak efficiency torque for a given motor speed.

Figure 2:
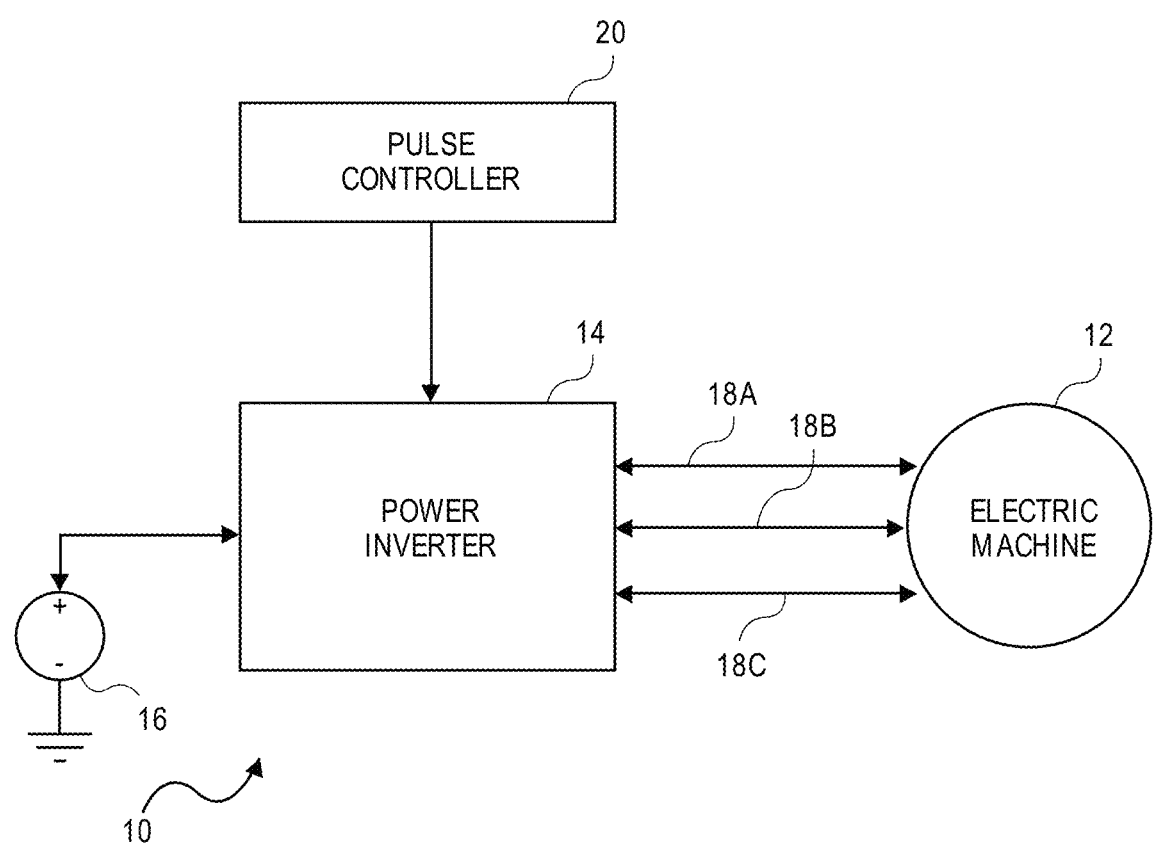
FIG. 2 illustrates a pulsed controlled electric machine in accordance with a non-exclusive embodiment of the present invention.

It should be noted that current and torque values and time scale provided herein are merely illustrative and are not intended to be limiting in any manner. In actual motor pulsing embodiments, the pulse duration used may widely vary based on the design needs of any particular system. In generally, however, the scale of the periods for each pulse cycle can widely vary on the order of 10 μsec to 10.0 seconds. In non-exclusive embodiments, the pulses for example may range from between 0.2 and 100 milliseconds (10 to 5000 Hz). Furthermore, there are a wide variety of different motors and each motor has its own unique efficiency characteristics. Further, at different motor speeds, a given motor will have a different maximum efficiency curve. The nature of the curve may vary depending on the particular motor or a particular application. For example, the current pulses need not be flat topped as depicted in FIG. 2 and/or the current need not go to zero during periods between pulses but may be some non-zero value. Regardless of the particular curve used, however, at some proportion of the time the motor is operating is preferably at or near its highest efficiency region for a given motor speed.

Power Inverter

Referring to FIG. 2, a diagram of a power controller 10 for pulsed operation of a three phase electric machine 12 is illustrated. As noted above, the electric machine 12 is any type of electric machine with field weakening capabilities, such as any type of electric machine with a permanent magnet rotor design, including for example permanent magnet assisted synchronous reluctance machines and IPM machines The power controller 10 includes a power inverter 14, a DC power supply 16, and a pulse controller 20. The power inverter 14 may be operated as a power inverter or power rectifier depending on the direction of energy flow through the system.

When the electric machine 12 is operated as a motor, the power inverter 14 is responsible for generating three-phased AC power (denoted as 18A, 18B and 18C for phases A, B and C respectively) from the DC power supply 16. The three-phased input power is applied to the windings of the stator of the electric machine 12 for generating a Rotating Magnetic Force (RMF). For most common permanent magnetic motors, the rotor field is that of the permanent magnet. In an induction motor this rotation field induces current to flow in the rotor winding which in turn induces a rotor magnetic field. The interaction of the rotor and stator magnetic fields generates an electromagnetic force (EMF) causing rotation of the rotor, which in turn rotates a motor shaft. The rotating shaft provides the output torque of the motor.

The three phases, 18A-18C are each depicted by lines with arrows on both ends indicating that current can flow in either direction. When used as a motor, current flows from the power supply 16, through the power inverter 14, to the electric machine 12. When used as a generator, the current flows from the electric machine 12, through the power inverter 14, to the power supply 16. When operating as a generator, the power inverter 14 essentially operates as a power rectifier and the AC power coming from the electric machine 12 is converted to DC power being stored in the DC power supply, such as a battery or capacitor.

The pulse controller 20 is responsible for selectively pulsing the three-phased input current 18A-18C to the electric machine 12. During conventional (i.e., continuous) operation, the three-phased input current provided to the electric machine 12 is continuous sinusoidal current signals, each 120° degrees out of phase with respect to one another. During pulsed operation, the phased three sinusoidal current signals 18A-18C are selectively pulsed using any of the approaches described herein.

Figure 4A:
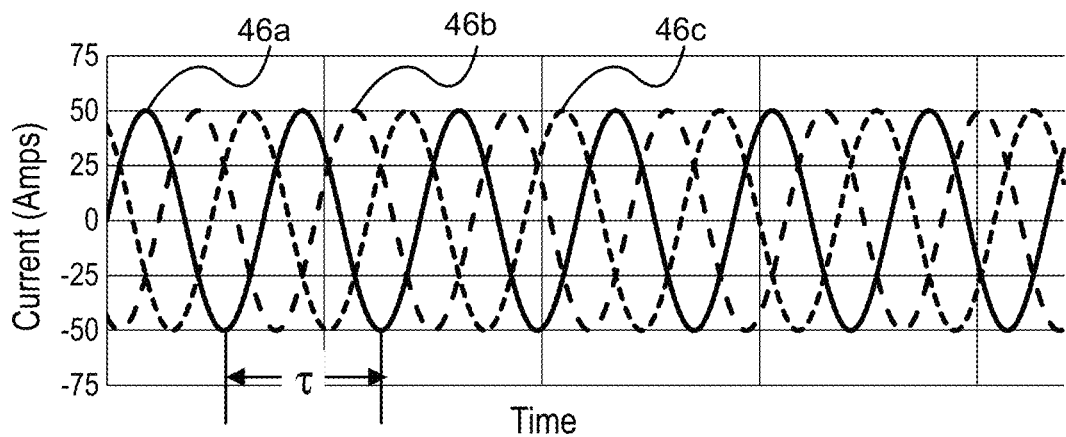
FIG. 4A is a diagrammatic representation of a continuous three-phase AC waveform provided to an electric machine.
Figure 4B:
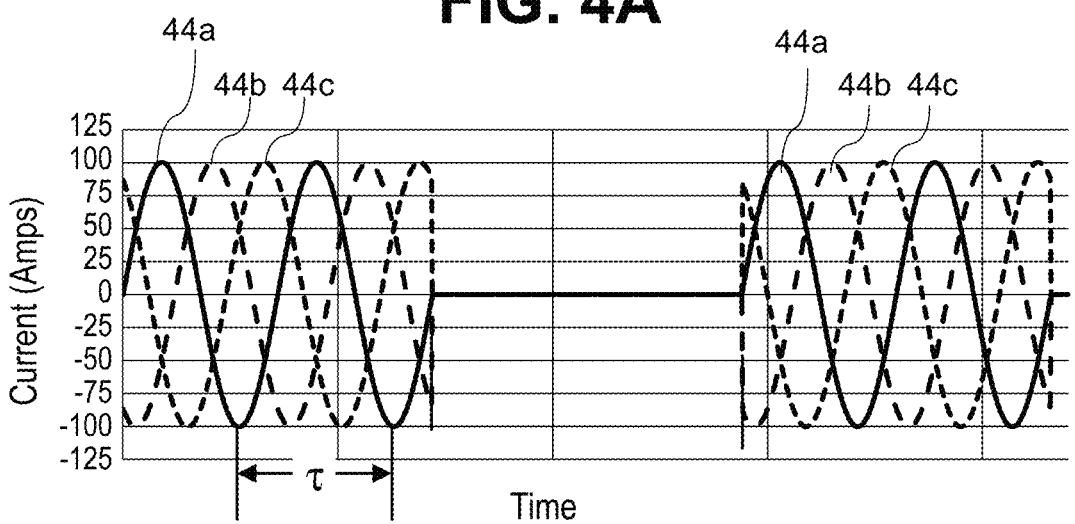
FIGS. 4B and 4C are different examples of pulsed three-phase AC waveform having a similar duty cycle that provide the same torque as the continuous waveform of FIG. 4A.
Figure 4C:
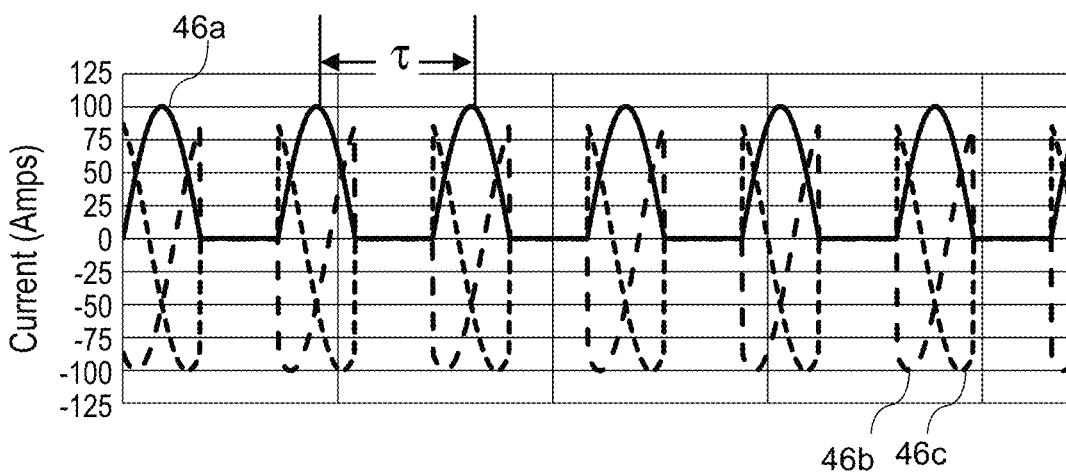

Referring to FIG. 4A-4C, plots are provided for illustrating the difference between continuous and pulsed three-phased current provided to/by the electric machine 12. In each, current is plotted on the vertical axis and time is plotted along the horizontal axis.

FIG. 4A illustrates conventional sinusoidal three-phased current 42a, 42b, and 42c delivered to/produced by the electric machine 12 during excitation. Phase B, denoted by curve 42b lags phase A, denoted by 42a by 120 degrees. Phase C, denoted by curve 42c, lags phase B by 120 degrees. The sine wave period is T. The three-phased current 42a, 42b, and 42c is continuous (not pulsed) and has a designated maximum amplitude of approximately 50 amps. It should be appreciated that 50 amps is only a representative maximum current and the maximum current may have any value.

FIG. 4B and FIG. 4C illustrate two examples of different pulsed three-phased sinusoidal current waveforms 44a, 44b, and 44c and 46a, 46b, and 46c respectively. Note, each set of waveforms have a fifty percent (50%) duty cycle and peak amplitude of approximately 100 amps.

In FIG. 4A the period of the sinusoidal waveforms 44a, 44b, and 44c is τ, however, the sine waveforms are each modulated on and off. The difference between pulsed currents 44a-c and 46a-c of FIG. 4C is the duration of their respective current pulses and the interleaved "off" periods. In FIG. 4B, the current pulses 44a-c is interleaved with "off" periods of equal length. The length of each on and off period is 2τ. In FIG. 4C, the current pulses 46a-c and the interleaved "off" periods again have equal duration. In this case the duration is τ/2. In both examples, the duty cycle is 50%. However, the duration of the "on" and "off" time durations periods is different, i.e. the frequency of the pulsed modulation is different. The frequency of the pulsed modulation may vary based on the type of electrical machine used, noise and vibration considerations, current operating rotor speed, and other factors.

When operating as a motor, the excitation current in FIG. 4B and FIG. 4C delivers the same average torque as the continuously applied three-phased current of FIG. 4A (assuming torque is proportional to current, which is often the case with surface permanent magnet type electric machines).

FIG. 4B and FIG. 4C illustrate applications in which the "on" drive pulses are evenly spaced while the electric machine is operated at a steady state desired output level. Such an approach works well in many circumstances but is not a requirement. The duty cycle need not be 50% but can be adjusted to match the desired average torque. In FIG. 4B and FIG. 4C the phase of the pulses is synchronized with the applied AC power; however, the phase of the pulses need not be synchronized with the phase of the applied AC power in some embodiments. Thus, the relative sizes and/or timing of the electric machine drive pulses can be varied as long as they average out to the desired average torque.

Electric Machine Efficiency and Maps

The efficiency of an electric machine operating in a system can be improved by modulating operation to occur in more efficient regions and minimizing operation in inefficient regions while still meeting requested torque demands. Accordingly, to improve the efficiency of a given system, its peak efficiency and less efficient operating regions need to be identified.

Figure 5:
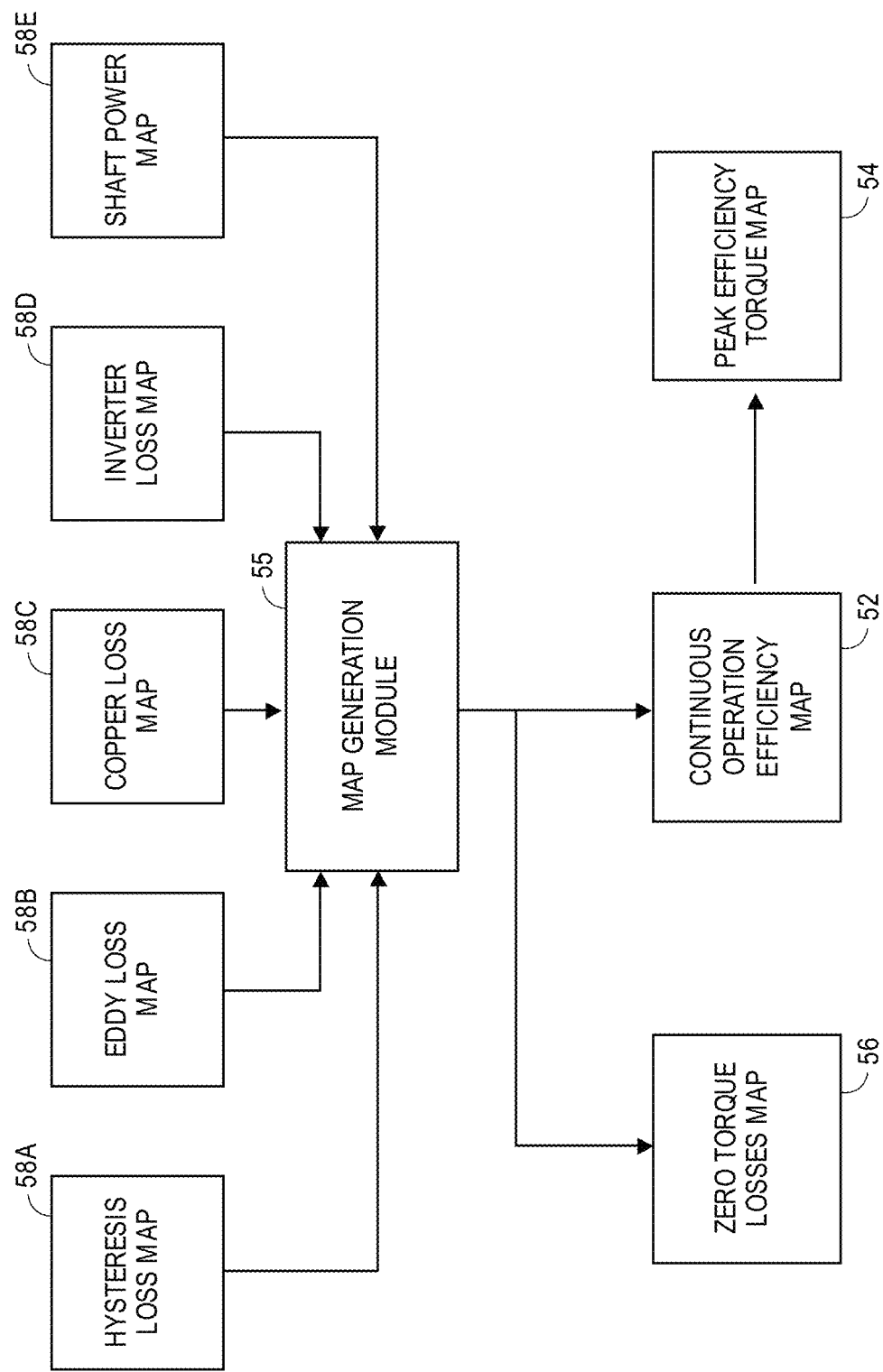
FIG. 5 is a diagram illustrating generation of a modulation efficiency map, a peak efficiency torque map and a zero torque losses map for an exemplary electric machine.

Referring to FIG. 5, a diagram 50 illustrating how a continuous operation efficiency map 52, a peak efficiency torque map 54 and a zero torque losses map 56 for an exemplary system are generated is shown. As depicted in the figure, the maps 52, 54 and 56 for the system being considered are derived from generating a hysteresis loss map 58A, an eddy loss map 58B, a copper loss map 58C, an inverter loss map 58D, and a shaft power map 58E for a given machine. Other systems may have additional and/or different losses to consider such as windage and friction which should be considered as well. The maps for each of the parameters 58A-58E are generated from empirical data generated during operation and testing of the system.

To generate the efficiency maps, the electric machine is operated over a wide range of torque demands and speeds. As the electric machine is exercised, each of the above-listed parameters is measured. From these measurements, the maps 58A-58E are generated, indicative of the hysteresis, eddy, copper, inverter and machine shaft power losses over different speeds and torque ranges of the machine respectively.

With the maps 58A-58E defined, a map generation module 55 is then used to generate the continuous operation efficiency map 52 and the zero torque losses map 56 for the electric machine. The peak efficiency torque map 54 is then extracted from the continuous operation efficiency map 52. The peak efficiency torque map 54 is essentially a plot that maps the torque that corresponds to the maximum efficiency of the electric machine as a function of speed. Similarly, the zero torque losses map is generated from empirical data collected during operation of the electric machine over a wide range of speeds with the inverter controlling zero torque.

As described in more detail below, the continuous operation efficiency map 52, the peak efficiency torque map 54 and the zero torque losses map 56 are each used during modulated control of an electric machine whether operated as a motor or generator.

Permanent Magnets, BEMF and Field Weakening

For certain applications, including battery powered vehicles including hybrids, electric machines with rotor designs using permanent magnets are common. Such electric machines include, but are not limited to, permanent magnet assisted synchronous reluctance motor and Internal Permanent Magnetic (IPM) motors. While such electric machines are generally efficient and relatively inexpensive, and therefore advantageously used in electrical vehicle applications, they have some issues that are less than ideal.

When an electric machine with a rotor design using permanent magnets is energized, its rotor begins to rotate in sync with the stator magnetic field. The rotating permanent magnets of the rotor, in turn, induce an electromagnetic force or "EMF" in the stators windings, commonly referred to as back EMF or "BEMF". BEMF acts against the applied voltage that causes the stator current to flow, and hence, the rotor to spin in the first place. As a result, the current flowing in the stator falls to zero as the BEMF approaches the applied voltage to the electric machine so naturally limiting the shaft speed.

Field weakening is a known technique used to reduce the negative effects of BEMF. By reducing or weakening the magnetic field, BEMF is reduced allowing the generation of motoring torque and when generating controlling the BEMF to less than that limited by the inverter supply voltage allows controlled current to flow back to the inverter power supply at speeds in excess of that which would be possible without field weakening.

Without field weakening the motor speed will naturally be limited by the inverter's supply voltage to below that requiring field weakening when motoring. To operate at a higher speed it is possible to gradually field weaken such that the BEMF is reduced so as to allow the motor to increase in speed until such time as it becomes limited once more by the supply voltage of the inverter. When the supply voltage is once again exceeded, more field weakening may be applied. Only when the field weakening fails to maintain the BEMF below the inverter's supply voltage will the BEMF exceed the inverter's supply voltage. This may result in uncontrolled rectification due to the uni-polar nature of the power semiconductor devices typically used in the inverter. When this scenario occurs, energy is extracted from the motor and returned to the inverter's power supply (i.e. generating). This will retard the speed of the motor, rapidly resulting in the BEMF being equal to or less than the inverter's voltage.

When generating, the machine is not in control of the speed at which it rotates. As such unless it is field weakened, as per motoring, the BEMF will exceed the inverter's voltage but this time the uncontrolled rectification will only place a retarding torque on the shaft which may or may not slow the speed. This is typically an area of operation that is not desirable because even disabling the inverter will not stop the uncontrolled rectification.

Modulated Electric Machine Control

Figure 6:
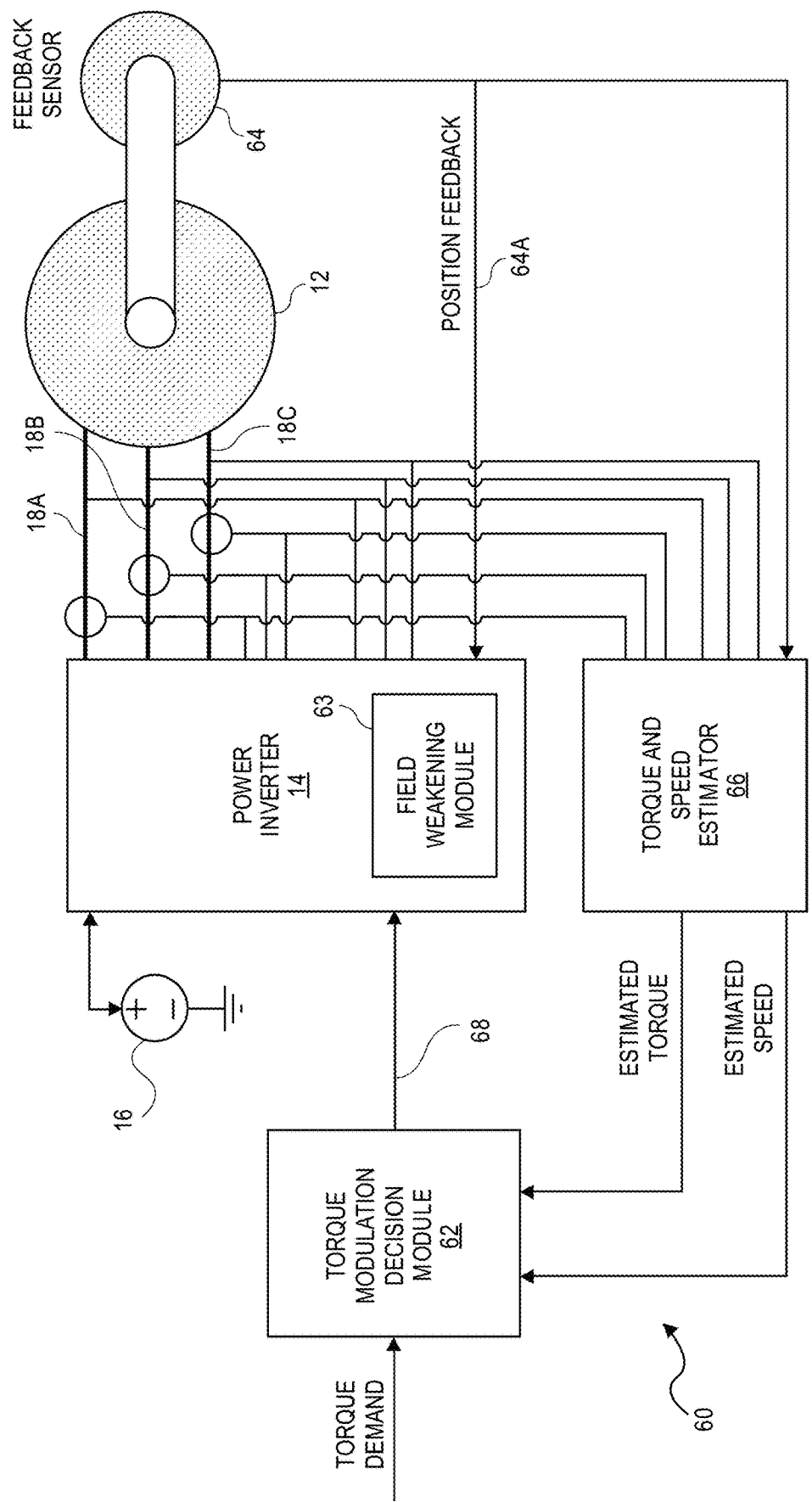
FIG. 6 is a diagram illustrating a controller for modulating energy supplied to an electric machine in accordance with a non-exclusive embodiment of the invention.

Referring to FIG. 6, a diagram illustrating a system 60 for pulse modulating the energy supplied to and from an electric machine 12 is illustrated. The system 60 includes the electric machine 12, a power inverter 14 for controlling three-phased AC power (denoted as 18A, 18B and 18C for phases A, B and C respectively) to and from a DC power supply 16 to control the electric machine 12, a torque control decision module 62, a field weakening module 63 provided within the inverter 14, an optional feedback sensor 64 for generating a feedback signal 64A indicative of the angular position of the rotor of the electric machine 12 and an optional torque and speed estimator 66.

During operation of the system 60, the torque modulation decision module 62 receives a torque demand. In response, the torque modulation decision module 62 makes a determination of whether the requested torque demand is more or less than a designated "pulsing" threshold associated with the current machine speed. The pulsing threshold will vary as a function of the speed of the electric machine 12 and possibly other considerations. In some embodiments, the pulsing threshold for a given speed may be the same as the peak efficiency torque of the electric machine 12 for that speed. In other situations, other considerations or factors that may go into the determination of the appropriate pulsing threshold for any particular motor/generator speed. The net operational efficiency of the electric machine, or a larger system that includes the electric machine, may also be considered. For instance, if the torque demand is very close to the peak efficiency torque (e.g., 98% or 99% of the peak efficiency torque), then other considerations such as real-world losses associated with pulsed operation may overwhelm any the incremental gain of pulsed versus continuous operation. In which case, the threshold may be modified so as to allow continuous operation. Other factors (e.g., NVH mitigation concerns) may be considered as well. Accordingly, the term "threshold" as used herein should be broadly construed and should not be limited to just the peak efficiency torque of a given electric machine 12.

When the torque demand is larger than the threshold, the torque modulation decision module 62 operates the electric machine 12 in the continuous mode. In which case, the waveform 68 provided to the power inverter 14 is indicative of continuous operation of the electric machine 12. In response, for the three phase electric machine illustrated, the three phase power signals 18A, 18B and 18C generated by the inverter 14 are continuous sinusoidal waves having a required magnitude and phase to support the demanded torque. During continuous operation, the field weakening module 63 may apply field weakening as needed.

When the torque demand is less than the threshold, then the electric machine 12 is operated in a pulsed mode. In which case, the waveform 68 provided by the torque modulation decision module 62 to the inverter 14 defines (a) a duty cycle and (b) magnitude for pulsing the three phase power signals 18A, 18B and 18C to meet the demanded torque.

During pulsed operating of the motor 12, the inverter is activated during pulses and is ideally deactivated between pulses. Deactivating the inverter is conceptually desirable because it helps reduce inverter losses and inverter induced losses during the no torque periods. However, there are times when it will be desirable to have the inverter actively command zero torque during the no torque periods (or at least a portion of the no torque periods). There are several reasons for this. One of the easiest to appreciate relates to back BEMF. As discussed above, when the BEMF of a motor exceeds the supply voltage 16 used by the motor, a retarding torque is generated that can significantly degrade the motor's efficiency. Field weakening is typically used to mitigate or eliminate the retarding torque. BEMF generated by a motor is primarily a function of motor speed. Therefore BEMF remains an issue during the no torque periods of pulsed motor control. Since field weakening is applied by the inverter, deactivating the inverter during the no torque periods of pulsed control in operating states of a motor in which field weakening is desired would have the effect of allowing BEMF to retard the motor during those periods thereby reducing the motor's overall efficiency (sometimes quite significantly). To mitigate these effects, the inverter is preferably left on commanding a zero torque during the no torque periods of pulsed control in operating regions where the BEMF exceeds the supply voltage.

In some embodiments, the inverter 14, effectively determines whether the BEMF of the electric machine 12 exceeds the supply voltage 16 used by the inverter 14. This can be accomplished by comparing the machine's current shaft speed (e.g. RPM) to a known speed threshold or via other suitable techniques. When the BEMF is less than the supply voltage 16, then the inverter is deactivated during the no torque periods of pulsed controls. On the other hand if the BEMF value is larger than the supply voltage, then the inverter 14 remains activated, zero torque is demanded, and the field weakening module 63 applies field weakening as appropriate. In response, the BEMF is reduced and any retarding torque that would otherwise be generated by the electric machine is mitigated or eliminated altogether.

The pulsed electric machine control framework described above generally chooses one of three operating modes states for any given operational state (e.g. machine speed and torque demand) based on efficiency and potentially other considerations. First, in operating regions where pulsed control doesn't offer efficiency benefits, the electric machine is continuously operating in continuous manner. In operating regions where pulsed control does offer benefits, pulsing is employed. When operating in the pulsed mode, a further decision is made regarding whether to disable the inverter during the no torque periods. The inverter disable decision is made primarily based on efficiency considerations. When conditions permit and it is more energy efficient to disable the inverter during the no torque periods, the inverter is disabled. When it is more energy efficient to maintain the inverter commanding a zero torque during the no torque periods of pulsed control, the inverter is operated in that manner. In the context of BEMF, when BEMF exceeds the supply voltage 16, the inverter 14 is kept activate to facilitate the application of field weakening thereby mitigating or eliminating retarding torque that would be detrimental to the efficiency of the electric machine.

In practice, the characteristics of the electric machine and or a system that includes the electric machine may be characterized through the creation of operational maps such as the efficiency and loss maps described above. Base on such maps, the most efficient operational state for any and all operating conditions (e.g., all possible machine speed and output level combinations) can be determined. In this context, the operational state may include an indication of whether pulsed control is enabled, and if so, (a) the desired target output level when during the torque on periods; (b) the desired duty cycle; and (c) whether the inverter should be remain active or be deactivated during the no torque periods. In some embodiments, this information may be stored in a data structure such as a lookup table that may be utilized by toque modulation decision module 62 to determine the appropriate inverter control signal 68 for any commanded output (e.g., torque demand) based on the current machine speed, etc. In other embodiments, the torque modulation decision module may use algorithmic or other suitable approaches to make such decisions.

In an optional embodiment, the feedback sensor 64 generates the feedback signal 64A, which is indicative of the angular position of the rotor of the electric machine 12. The feedback signal 64A is provided to each of the power inverter 14 and the torque and speed estimator 66. With the angular position of the rotor known, the torque and speed estimator 66 can provide accurate estimates of the torque and speed of the electric machine to the torque modulation decision module 62. In response, the waveform 68 can be adjusted as necessary so that the timing of switching network (i.e., the timing of turning the switches S1-S6 on/off) within the power inverter 14 can be precisely controlled so that each of the phases 18A, 18B and 18C are timed to ensure the distribution of the torque pulses do not induce NVH. As a result, the operation of the electric machine 12 is both smooth and efficient.

It should be noted that the use of a feedback sensor 64 is not mandatory and that other techniques can be used for measuring or estimating the angular position of the rotor of the electric machine 12. For instance, any of a number of sensor-less approaches may be used as well. Example of sensor-less approaches may include BEMF sensing, phase current sensing, saliency detection through high frequency injection or other methods or any combination of thereof.

With conventional continuous operation, the losses are continuous. On the other hand with pulsed modulation, losses are largely dependent on the duty cycle. With pulsed modulation, the electric machine oscillates between its operational peak efficiency during pulses and in the time periods between pulses, either the inverter is deactivated or the inverter is activated, zero torque is demanded, and any retarding torque is mitigated or eliminated. As a result, losses are minimal and the average torque is generated at an overall higher efficiency level compared to the same average torque generated by conventional continuous operation. Pulsed modulation, therefore, offers a gain in efficiency over conventional continuous operation when an electric machine is operating in regions below its peak efficiency torque.

It is noted that in some circumstances, using a constant pulsed duty cycle may result in undesirable noise, harshness and vibration (NVH). In some implementations, sigma-delta modulation may be used to mitigate such issues. In a non-exclusive embodiment, the torque modulation decision module 62 is a sigma-delta decision module. Exemplary sigma-delta decision modules are described in the U.S. application Ser. Nos. 16/353,159 and 16/353,166, both filed Mar. 14, 2019, and both incorporated herein for all purposes.

It is noted that the above description of the electric machine 12 is largely described in the context of operating as a motor. It should be understood that when the electric machine operates as a generator, the pulsed control provides more efficient generation of electrical energy.

Operational Flow Diagrams

Figure 7A:
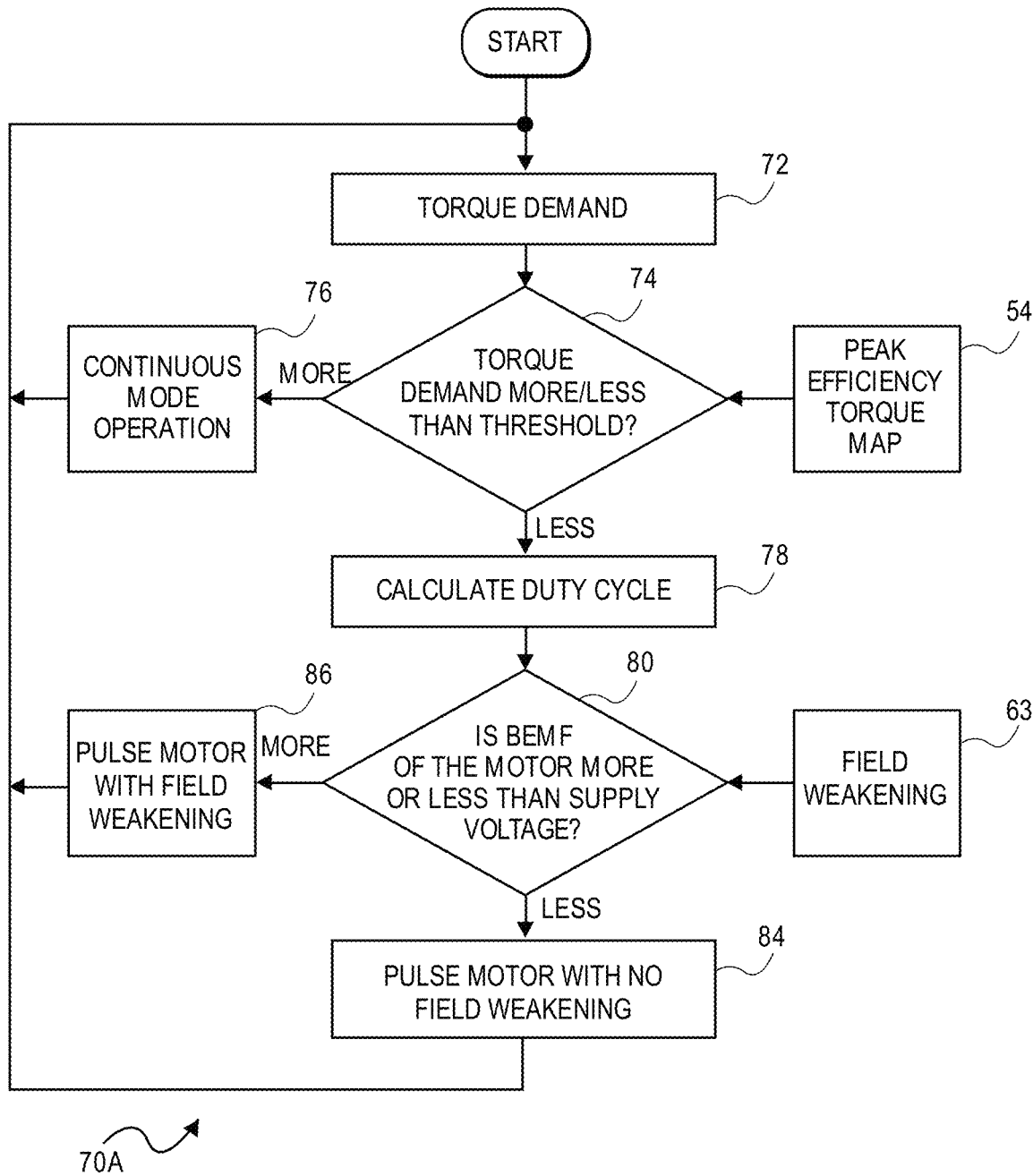
FIGS. 7A and 7B are flow diagrams illustrating control steps for modulating the control of an electric machine.
Figure 7B:
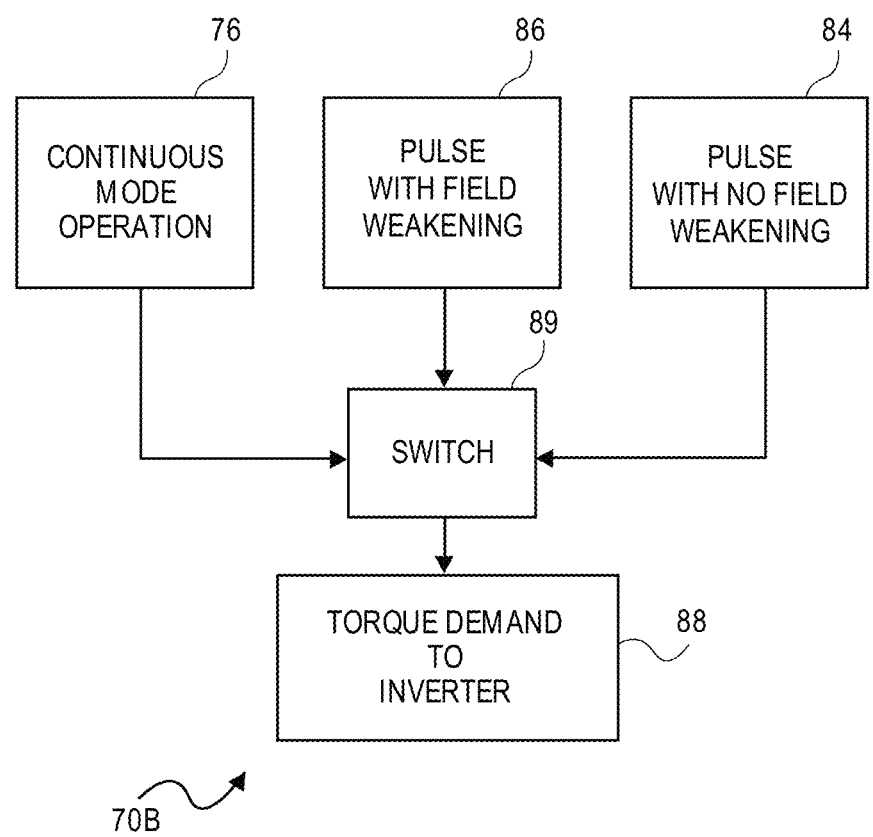

Referring to FIGS. 7A and 7B, operational flow diagrams 70A, 70B for implementing pulsed modulation with field weakening is illustrated.

In step 72, the torque demand requested of the electric machine 12 received.

In decision 74, the torque modulation decision module 62 compares the demanded torque with a predetermined pulsing threshold for the current speed. As previously noted, the threshold can be the same or different than the peak efficiency torque for the current speed.

In step 76, the torque modulation decision module 62 determines the electric machine 12 should operate in the continuous mode if the torque demand is greater than the pulsing threshold. During continuous operation, the field weakening module 63 may apply field weakening as needed. On the other hand, if the torque demand is less than the threshold, a decision is made to operate the electric machine 12 in a pulsed mode.

In step 78, a duty cycle for the pulses is defined by the torque modulation decision module 62. As previously described, typically any of a number of different duty cycles may be used to meet the requested torque demand and the selected duty cycle may be based on a number of considerations, such as noise and vibration considerations, current operating rotor speed, and other factors. Also in embodiments where the module 62 is a sigma-delta module, a pulse on/no pulse sequence that meets the duty cycle is defined using sigma-delta modulation.

In decision 80, it is determined if the field weakening module 63 should apply field weakening or not based upon a comparison of motor BEMF and the inverter supply voltage. This decision is then used to decide if the inverter can be deactivated during the period of time between pulses.

If BEMF is less than the supply voltage for the inverter, then the electric machine is operated in the pulsed mode with the inverter 14 being deactivated during the period of time between the pulses with no field weakening.

If BEMF is more than the supply voltage for the inverter, then the inverter 14 remains active during the no torque periods between pulses with a commanded torque of zero. This allows the inverter to continue to apply field weakening during the no torque periods between pulses. As a result, uncontrolled return rectified current is reduced and the resulting retarding torque is mitigated or eliminated.

It is noted that with the above arrangement, it is possible to transition from inverter deactivated to inverter activated with zero torque demand with field weakening (or vice versa) during the period between two pulses. However, as the time period between pulses is typically relatively small in most real word applications, it may not be practical to do so.

The operational steps associated with the flow diagrams 70A, 70B may be implemented in a number of ways. In one embodiment, the torque modulation decision module 62 may rely on an algorithm to implement the above-described steps. In an alternative embodiment, the torque modulation decision module 62 may relying on one or more look up tables. Depending on the torque demand and current speed, the torque modulation decision module 62 is able to make decisions if the torque demand is more or less than the pulsing threshold and if field weakening should be applied or not. In such embodiments, the one or more tables are typically constructed from empirical data collected while exercising the electric machine 12 over a wide range speeds and torque demands. As the electric machine 12 is tested, parameters are collected over a wide range of speed and toque request combinations and then tabulated, resulting in the one or more look up tables.

Power Inverter with Boost

In commonly assigned U.S. application Ser. No. 16/818,570 filed Mar. 13, 2020, an exemplary power inverter including a boost circuit was disclosed. The disclosed inverter includes a switching network having a pair of switches, each coupled between positive and negative voltage rails, for each of phases A, B and C coupled respectively for exciting a machine. The boost circuit includes a boost supply (e.g., charge pump or separate voltage source) capable of generating a boost voltage and/or a storage device such as another capacitor and/or battery. During pulsed operation, the boost supply is used to boost the voltage of the positive rail. As a result, the transition of the pulses is faster, which further improves efficiency. In a non-exclusive embodiment, the boost circuit as described in the aforementioned U.S. application Ser. No. 16/818,570 is incorporated herein and may be used as the power inverter 14 as described herein.

Three Phased Energy Signal Examples

As described herein, operation of the electric machine 12 has been described in a continuous mode, a pulsed mode, a pulse mode using delta-sigma modulation and finally in a pulsed mode with the application of field weakening. For the sake of clarity, exemplary three phased AC current signals 18A, 18B and 18C for phases A, B and C used to excite the machine 12 are described below for each scenario.

Figure 8A:
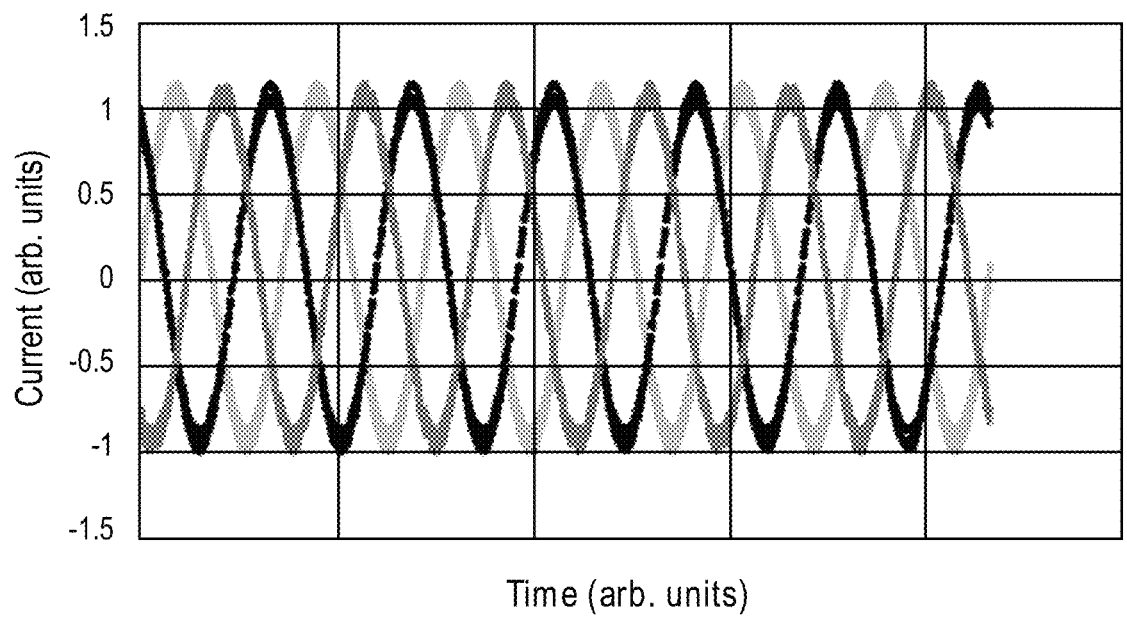
FIG. 8A through FIG. 8D are various examples of three-phased AC power signals used to excite an electric motor under various conditions in accordance with various embodiments.

Referring to FIG. 8A, exemplary three phased AC power signals for phases A, B and C used to excite the machine 12 during continuous operation are shown. In this situation, the current signals are proportional to the demanded torque. As a result, shaft toque meets the demanded torque.

Figure 8B:
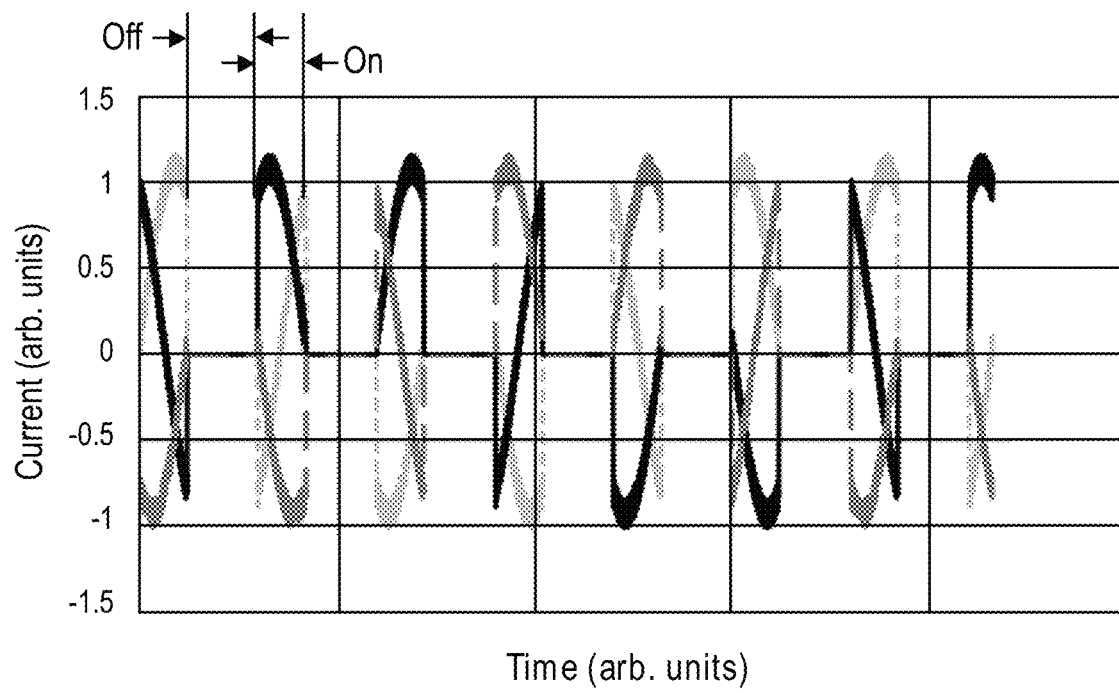

Referring to FIG. 8B, exemplary three phased AC power signals for phases A, B and C are shown during pulsed operation. By modulating the phase excitation of the signals between the peak efficiency during pulses and off between pulses as shown, the average shaft torque is equal to the demanded torque (e.g., forty percent (40%)), but typically operates more efficiently than generating a continuous torque output at the same level. As previously noted, the pulse frequency or duty cycle can be adjusted as needed based on noise, vibration and harshness and/or other considerations.

Figure 8C:
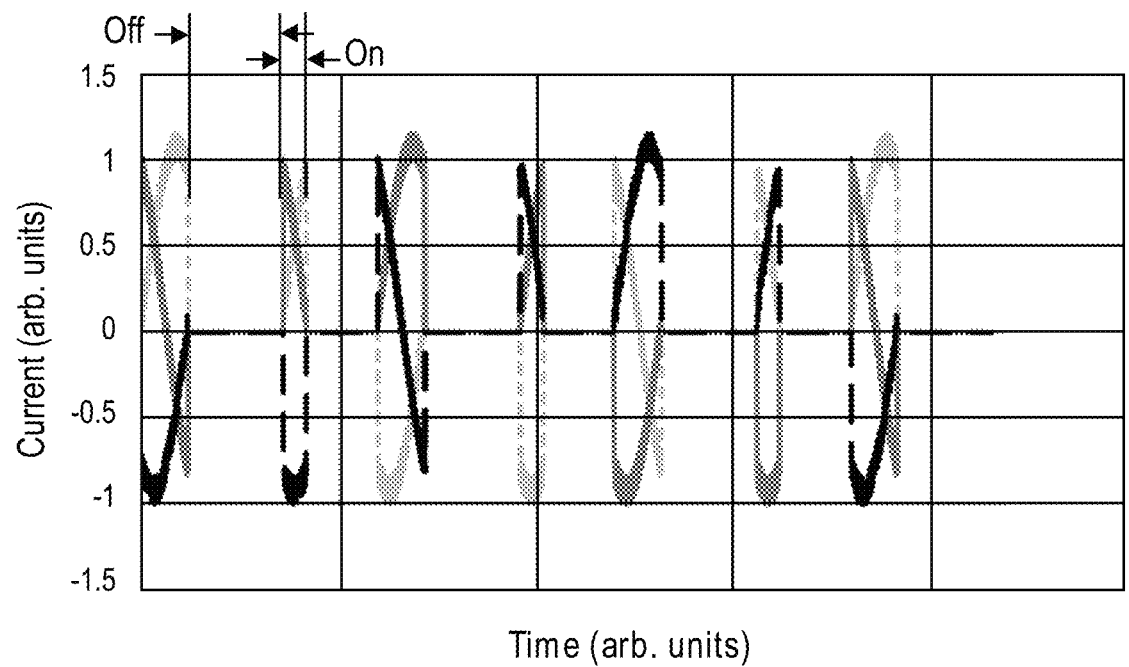

Referring to FIG. 8C, exemplary phase excitation current of the AC power signals are shown when the torque modulation decision module 62 uses sigma-delta modulation. In this particular example, the duty cycle of forty percent (40%) is illustrated. If the same pulse width of FIG. 8B is used, an exemplary pulse pattern of (pulse, skip, skip, pulse and skip) can be used to achieve the 40% duty cycle using sigma-delta modulation.

Figure 8D:
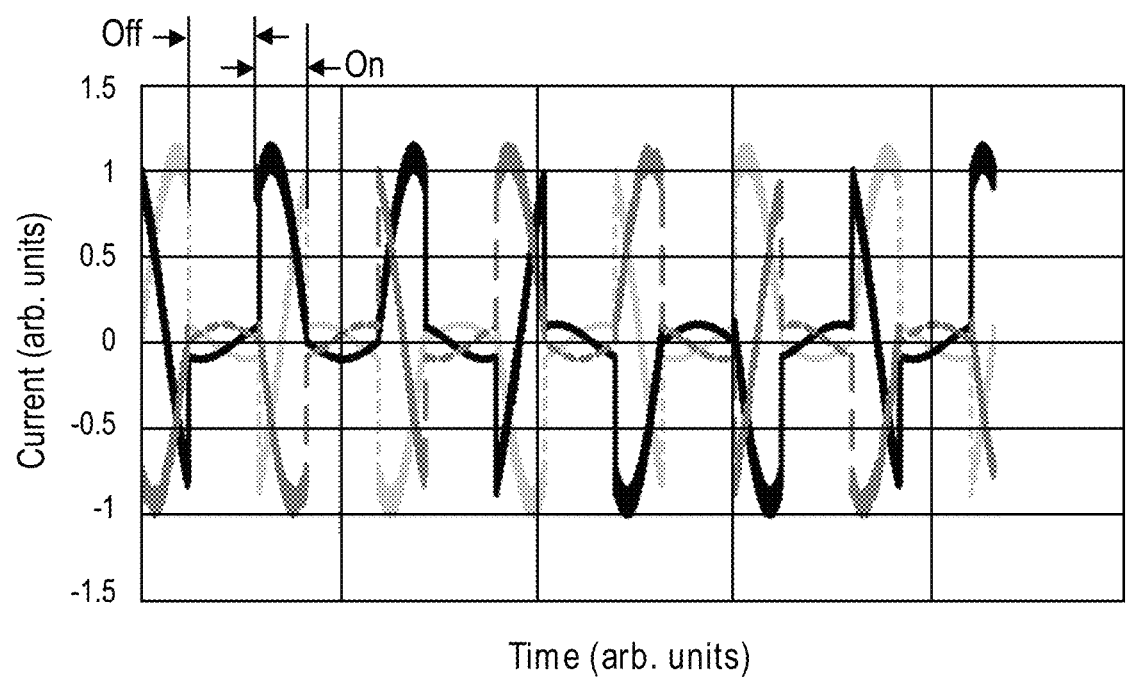

Finally, FIG. 8D shows exemplary phase excitation current of the AC current signals when the BEMF exceeds the voltage supply 16 and field weakening is applied. In FIG. 8D, several differences are present with regard to the pulsed operation without field weakening as illustrated in FIG. 8B and FIG. 8C. First, between pulses a small magnetizing current flows through the inverter 14. As a result, the inverter is not entirely disable between pulses. It is also noted in FIG. 8D that a phase shift occurs in the waveform between the activated period and the deactivated period representing the phase shift between torque producing current and pure demagnetizing only current.

Electric Machine Types

The electric machine 12 as described herein is any type of electric machine capable of reducing BEMF by applying field weakening. Examples of include, but are not limited to machines and/or motors including, but not limited to, internal permanent magnets, surface permanent magnets, induction, synchronous reluctance, permanent assisted synchronous reluctance, separately excited induction, flux switching, switch reluctance, and other types of machines and/or motors.

The present embodiments should be considered illustrative and not restrictive and the invention is not to be limited to the details given herein but may be modified within the scope and equivalents of the appended claims.

What is claimed is:

1. A method comprising:
    operating the motor in a pulsed mode if a received torque demand is less than a threshold; and
    applying field weakening to the motor if back electromagnetic force (BEMF) of the motor is more than a supply voltage applied to a power inverter used to excite the motor.

2. The method of claim 1, further comprising during a period of time between pulses when operating in the pulse mode:
    (a) maintaining the inverter activated, but demanding no torque, when applying the field weakening to the motor; and
    (b) deactivating the inverter when no field weakening is applied.

3. The method of claim 1, further comprising applying no field weakening to the motor when the BEMF of the motor is less than the supply voltage when the motor is operating in the pulsed mode.

4. The method of claim 1, further comprising:
    operating the motor in a continuous mode if the received torque demand exceeds the threshold; and
    applying no field weakening to the motor when the BEMF of the motor is less than the supply voltage applied to the power inverter during the continuous mode.

5. The method of any of claim 1, further comprising ascertaining a duty cycle and a magnitude for pulses when operating the motor in the pulse mode, the duty cycle and the magnitude for the pulses sufficient to meet the requested torque demand.

6. The method of claim 1, further comprising using a sigma-delta modulation to modulate pulses when operating the motor in the pulse mode.

7. The method of claim 1, further comprising preventing or mitigating the motor from generating a retarding torque when the field weakening is applied to the motor.

8. The method of claim 1, wherein operating the motor in the pulsed mode further comprises interspersing pulses in which the motor is generating torque at or above the threshold with periods in which the motor is generating little or no toque during periods of time between the pulses, wherein the pulses in which the motor is operating have a duty cycle and a magnitude sufficient for an average torque output of the motor during the pulses to meet the requested torque demand.

9. The method claim 1, further comprising ascertaining if the received torque demand exceeds the threshold of the motor for a given motor speed by accessing an efficiency torque map for the motor,
wherein the efficiency torque map is derived from one or more loss map(s) for one or more operational parameters of the motor selected from the group including a hysteresis loss map, an eddy current loss map, a copper loss map, an inverter loss map or a motor shaft loss map.

10. The method of claim 9, further comprising ascertaining if the BEMF of the motor is less than the supply voltage and deactivating the inverter during periods between pulses when the BEMF of the motor is less than the supply voltage.

11. The method of claim 1, wherein the threshold is dependent on a current speed of the motor and is the same as or is derived from a peak efficiency torque for the motor.

12. A motor assembly configured to:
operate a motor in a pulse mode wherein the motor:
(a) generates substantially no torque between on pulses; and
(b) generates sufficient torque during the on pulses to meet a torque demand; and
apply field weakening during the pulsed mode operation of the motor when back electromagnetic force (BEMF) of the motor exceeds a supply voltage provided to an inverter that is used to excite the motor.

13. The motor assembly of claim 12, further comprising:
maintaining the inverter activated during periods of time between on pulses during pulsed operation when field weakening is applied, but with zero demanded torque; and
when field weakening is not applied, maintaining the inverter in a deactivated state during the periods of time between the on pulses.

14. The motor configuration of claim 12, further comprising a torque modulation decision module configured to:
receive the torque demand for the motor;
operate the motor in a continuous mode if the received torque demand exceeds a threshold torque; and
operate the motor in the pulsed mode if the received torque demand is less than the threshold torque.

15. The motor assembly of claim 14, wherein the torque modulation decision module is further configured to provide a waveform to the inverter indicative of either continuous operation of the motor in the continuous mode or pulse operation in the pulsed mode depending on if the received torque demand exceeds or is less than the threshold torque of the motor respectively.

16. The motor assembly claim 15, wherein the waveform is indicative of a duty cycle for the on pulses when operating the motor in the pulse mode.

17. The motor assembly claim 12, wherein the inverter further includes a field weakening module to either (a) apply the field weakening when the BEMF of the motor exceeds the supply voltage provided to the inverter or (b) not apply the field weakening when the BEMF is less than the supply voltage provided to the inverter.

18. The motor assembly 12, further comprising a sigma-delta torque modulation module configured to use sigma delta modulation to generate a modulated waveform for the inverter to control pulsing of the motor during the pulsed mode operation.

19. The motor assembly claim 12, wherein the motor is selected from the group including the following types of motors:
internal permanent magnet motors;
surface permanent magnet motors,
induction motors,
synchronous reluctance motors,
permanent assisted synchronous reluctance motors,
separately excited induction motors,
flux switching motors, and
switch reluctance motors.

20. The motor assembly of claim 12, further arranged to also apply field weakening during continuous operation of the motor when the BEMF of the motor exceeds a supply voltage provided to the inverter that is used to excite the motor.

21. The motor assembly of claim 12, wherein the motor is capable of reducing the BEMF in response to the field weakening by weakening a magnetic field associated with the motor.

22. The motor assembly of claim 12, wherein the motor is an electric machine capable of operating as a generator.

23. The motor assembly of claim 12, wherein the inverter is deactivated during the pulsed operation when field weakening is not required for mitigating or eliminating generation of a retarding motor torque when the BEMF does not exceeds the supply voltage.

24. The motor assembly claim 14, wherein the threshold torque is dependent on a speed of the motor and is the same or is derived from a peak efficiency torque for the motor.

25. A motor assembly configured to operate in multiple modes, including:
(a) a first pulsed mode with an inverter used to excite the motor is deactivated during periods between pulses when (i) a torque demand is less than a threshold torque and (ii) back electromagnetic force (BEMF) of the motor is less than a supply voltage provided to the inverter; and
(b) a second pulsed mode with the inverter turned activated, but no torque is demanded during periods between pulses when (i) the torque demand is less than a threshold torque and (ii) back electromagnetic force BEMF of the motor is more than the supply voltage provided to the inverter.

26. The motor assembly of claim 25, further configured to operate in (c) a continuous mode when a torque demand requested for the motor exceeds the threshold torque.

27. The motor assembly of claim 25, further configured to apply field weakening to the motor whenever the BEMF of the motor is more than the supply voltage provided to the inverter, the field weakening acting to prevent or mitigate the motor from generating a retarding torque.

28. The motor assembly of claim 25, wherein the motor is selected from the group including the following types of motors:
internal permanent magnet motors;
surface permanent magnet motors,
induction motors,
synchronous reluctance motors,
permanent assisted synchronous reluctance motors,
separately excited induction motors,
flux switching motors, and
switch reluctance motors.

29. The motor assembly claim 25, wherein pulses have a duty cycle and magnitude sufficient for an average torque output of the motor to meet the requested torque demand.

30. The motor assembly of claim 25, wherein the threshold torque is dependent on a speed of the motor and is the same as or is derived from a peak efficiency torque for the motor.

31. A motor assembly configured to:
 apply field weakening during a pulsed mode operation of a motor of the assembly when back electromagnetic force (BEMF) of the motor exceeds a supply voltage provided to an inverter that is used to excite the motor;
 maintain the inverter activated during periods of time between pulses during pulsed operation when field weakening is applied, but the motor generates no torque; and
 when field weakening is not applied, maintaining the inverter in a deactivated state during the periods of time between the pulses.

32. The motor configuration of claim 31, further comprising a torque modulation decision module configured to:
 receive a torque demand for the motor;
 operate the motor in a continuous mode if the received torque demand exceeds a threshold torque; and
 operate the motor in the pulsed mode if the received torque demand is less than the threshold torque.

33. The motor assembly of claim 32, wherein the torque modulation decision module is further configured to provide a waveform to the inverter indicative of either continuous operation of the motor in the continuous mode or pulse operation in the pulsed mode depending on if the received torque demand exceeds or is less than the threshold torque of the motor respectively.

34. The motor assembly claim 33, wherein the waveform is indicative of a duty cycle for the pulses when operating the motor in the pulse mode.

35. The motor assembly claim 31, wherein the inverter further includes a field weakening module to either (a) apply the field weakening when the BEMF of the motor exceeds the supply voltage provided to the inverter or (b) not apply the field weakening when the BEMF is less than the supply voltage provided to the inverter.

36. The motor assembly 31, further comprising a sigma-delta torque modulation module configured to use sigma delta modulation to generate a modulated waveform for the inverter to control pulsing of the motor during the pulsed mode operation.

37. The motor assembly claim 31, wherein the motor is selected from the group including the following types of motors:
 internal permanent magnet motors;
 surface permanent magnet motors,
 induction motors,
 synchronous reluctance motors,
 permanent assisted synchronous reluctance motors,
 separately excited induction motors,
 flux switching motors, and
 switch reluctance motors.

38. The motor assembly of claim 31, further arranged to also apply field weakening during continuous operation of the motor when the BEMF of the motor exceeds a supply voltage provided to the inverter that is used to excite the motor.

39. The motor assembly of claim 31, wherein the motor is capable of reducing the BEMF in response to the field weakening by weakening a magnetic field associated with the motor.

40. The motor assembly of claim 31, wherein the motor is an electric machine capable of operating as a generator.

41. The motor assembly of claim 31, wherein the inverter is deactivated during the pulsed operation when field weakening is not required for mitigating or eliminating generation of a retarding motor torque when the BEMF does not exceeds the supply voltage.

42. The motor assembly claim 32, wherein the threshold torque is dependent on a speed of the motor and is the same or is derived from a peak efficiency torque for the motor.

\* \* \* \* \*